US005279648A

United States Patent [19]

Chase

[11] Patent Number: 5,279,648

[45] Date of Patent: Jan. 18, 1994

[54] FOUNTAIN SOLUTION

[75] Inventor: Arthur R. Chase, Neenah, Wis.

[73] Assignee: Press Color, Inc., Glendale, Wis.

[21] Appl. No.: 980,655

[22] Filed: Nov. 24, 1992

[51] Int. Cl.[5] .................................................. C09K 3/18

[52] U.S. Cl. .................................................. 106/2; 101/451

[58] Field of Search .................................................. 106/2; 101/451

[56] References Cited

U.S. PATENT DOCUMENTS

| | | | |
|---|---|---|---|
| 4,238,279 | 12/1980 | Tsubai et al. | 106/2 |
| 4,374,036 | 2/1983 | Canale et al. | 106/2 |
| 4,731,119 | 3/1988 | Toyama et al. | 106/2 |
| 5,006,168 | 4/1991 | Modi et al. | 106/2 |
| 5,064,749 | 11/1991 | Matsumoto et al. | 106/2 |
| 5,106,414 | 3/1992 | Kunichika et al. | 106/2 |
| 5,163,999 | 11/1992 | Uchida et al. | 106/2 |
| 5,165,344 | 11/1992 | Matsumoto et al. | 106/2 |

*Primary Examiner*—Helene Klemanski

*Attorney, Agent, or Firm*—Godfrey & Kahn

[57] ABSTRACT

A fountain solution is described which possesses utility for use in printing, and which, in particular, is operable to wet the non-printing areas of a printing plate. The fountain solution of the subject invention includes, a poly alkoxylated polyether; a compatible surfactant; a hydroxypropylene cellulose gum; a polymerized, ethylene wax; and a sufficient amount of water. The fountain solution is thereafter supplied to a conventional printing press and is utilized in a conventional manner.

3 Claims, No Drawings

FOUNTAIN SOLUTION

BACKGROUND OF THE INVENTION

1. Field of the Invention

The present invention relates to a fountain solution for use in offset printing, and more particularly, to a fountain solution which is utilized with various conventional dampening systems, and wherein the fountain solution, when properly employed, is operable to wet the non-print areas of a printing plate thereby facilitating the offset printing process.

2. Description of the Prior Art

The prior art is replete with examples of unpatented fountain solutions which are utilized in offset printing. As should be understood, the most popular of the four major printing processes, lithography, employs a process whereby the image, and non-printing areas of a printing plate are essentially on the same plane of a thin, metal plate. The distinction between the image and the non-printing areas is maintained chemically. In particular, there are two basic differences between offset lithography and other processes, they are, (1) it is based on the principle that grease and water do not mix, and (2) ink is offset first from the metal plate to a rubber blanket, and then from the blanket to the target substrate.

As will be appreciated, when a printing plate is manufactured for use in offset printing, the image area of the plate is rendered ink receptive, and water repellant, and the non-print or non-image areas are rendered water receptive, and ink repellant. On the printing press, the printing plate is mounted on the plate cylinder, which, as it rotates, comes into contact successively with rollers which have been rendered wet by a dampening, or fountain solution, and rollers which have been wet by an ink solution. The fountain, or dampening solution, wets the non-print areas of the plate and prevents the ink from wetting these areas. The ink solution, in contrast, wets the image areas, which is then transferred to the intermediate blanket cylinder. The paper or target substrate then picks up the image as it passes between the blanket cylinder and an adjacent impression cylinder which presses the paper or target substrate against the blanket cylinder.

A conventional dampening system which applies a fountain solution to the printing press normally transfers the dampening solution directly to the printing plate. For example, in the Dahlgren type of direct-feed dampening system, the fountain solution which contains up to 25% alcohol, is metered to the plate through the inking system, or can be applied, alternatively, directly to the plate as in other systems. In general, this type of dampening system uses less water and reduces paper waste at start-up of the press. In view of the cost of isopropyl alcohol, and the potential health hazards attendant its use, a number of new fountain solutions have been developed to reduce or replace alcohol in these types of dampening systems.

While the prior art dampening systems have operated with some degree of success, they have a multiplicity of drawbacks which have detracted from their usefulness. As noted above, various prior art dampening systems have utilized alcohol in combination with water in order to render the water operable to "wet out" the non-printing areas of a plate, thereby causing these areas of the plate to repel the oil-based ink. In view of the health hazards, and other deficiencies, noted above, in utilizing isopropyl alcohol, printers began using glycol ethers. In this regard, the glycol ether of choice was butyl cellosolve, that is, ethylene glycol monobutyl ether. However, and while this glycol ether worked with some degree of success, it was undesirable inasmuch as it was considered to be in a class with other chemicals which were considered to be carcinogenic.

In view of the health hazards, and the harmful environmental effects of employing chemicals which are considered VOC's, and which are now otherwise prohibited or regulated by various state and federal laws, such as California Proposition 65, those skilled in the art have looked for new fountain solutions which do not have the attendant detrimental characteristics of the prior art fountain solutions but which have approximately the same or superior performance parameters.

Therefore, it has long been known that it would be desireable to have an improved fountain solution which has particular utility when utilized to wet the non-print areas of a printing plate for purposes of repelling oil-based inks, and which further can be readily substituted for the prior art fountain solutions utilized heretofore, the fountain solution of the present invention avoiding the shortcomings of the prior art which includes numerous health hazards, and the use of volatile organic compounds (VOC's), which have been otherwise restricted, or prohibited by public law.

SUMMARY OF THE INVENTION

Therefore, it is an object of the present invention to provide an improved fountain solution for use in printing.

Another object of the present invention is to provide a fountain solution which is particularly well-suited for use in offset printing and which further does not substantially impede the application of ink to the image areas of a printing plate.

Another object of the present invention is to provide such a fountain solution which is particularly well-suited for reoxidizing the surface of a printing plate, such as a printing plate which is manufactured from aluminum or the like.

Another object of the present invention is to provide a fountain solution which has constituent elements which are operable to maintain an associated blanket cylinder in a clean condition during the printing process.

Another object of the present invention is to provide a fountain solution which provides constituent elements which are operable to react with ions, such as iron, which are present in the water, thereby substantially impeding the deposit of the ions on the non-printing areas of the printing plate.

Another object of the present invention is to provide a fountain solution which has a constituent element which is operable to adjust the pH of the fountain solution and which further does not contaminate or otherwise impede the operation of any catalysts which are utilized therewith.

Another object of the present invention is to provide a fountain solution which includes a constituent element which operates as a preservative, thereby impeding the growth of microorganisms.

Another object of the present invention is to provide a fountain solution wherein the composition includes about 0.7% to about 1.5%, by weight, of a poly alkoxylated polyether; about 0.1% to about 0.15%, by weight, of a compatible surfactant; about 3% to about 10%, by weight, of a hydroxypropylene cellulose gum; about 0.6% to about 0.8%, by weight, of a polyethylene glycol wax; and about 85% to about 95%, by weight, of water.

Another object of the present invention is to provide a fountain solution which includes a constituent element which acts as a surfactant, but does not emulsify an ink solution, nor substantially foam, and which additionally facilitates the coating and transfer of the ink solution.

Another object of the present invention is to provide a fountain solution which is characterized by ease and simplicity in its utilization and which further can be employed at a substantially nominal expense in relative comparison to the prior art fountain solutions used heretofore.

Further objects and advantages are to provide improved elements and arrangements thereof in a fountain solution for the purposes intended and which is dependable, economical, convenient, and fully effective in accomplishing its intended purposes.

DESCRIPTION OF THE PREFERRED EMBODIMENT

The preferred formulation for the fountain solution of the present invention contains about 0.7% to about 1.5%, by weight, of a poly alkoxylated polyether; about 0.1% to about 0.15%, by weight, of a compatible surfactant; about 3% to about 10%, by weight, of a hydroxypropylene cellulose gum; about 0.6% to about 0.8%, by weight, of a polyethylene glycol wax; and about 85% to about 95%, by weight, of water.

The fountain solution of the present invention may additionally include about 12% to about 20%, by weight, of a compatible cellulose gum; about 0.7% to about 2%, by weight, of potassium nitrate; about 0.09% to about 0.2%, by weight, of sulfamic acid; about 0.1% to about 2.0%, by weight, of sodium benzoate; about 0.03% to about 2%, by weight, of magnesium sulfate; about 0.9% to about 2%, by weight, of gum arabic; about 2% to about 2.5%, by weight, of citric acid; and about 0.2% to about 0.3%, by weight, of sodium bisulfate. When the additional constituent elements are employed, the water component becomes approximately 59% to about 83%, by weight, of the entire formulation.

The fountain solution of the present invention, as noted above, includes about 0.7% to about 1.5%, by weight, of a poly alkoxylated polyether. In this regard, the poly alkoxylated ether may be purchased commercially from PPG Industries under the trade designation, Macol-5100. This poly alkoxylated polyether has excellent heat stability and is effective in the presence of acids. Additionally, this same substance appears to not have any deleterious effect on rubber rollers and further has acceptable lubricity. This compound is also noteworthy inasmuch as it does not substantially irritate the skin and causes minimal eye irritation. Additionally, this compound shows no propensity for emulsifying an ink solution, however, it does change somewhat, the flow characteristics thereof. In particular, the Macol-5100 acts as a special surfactant which does not foam, but facilitates the transfer of the ink and makes it easier to coat.

The fountain solution of the preferred formulation includes about 0.1% to about 0.15%, by weight, of a compatible surfactant. In this regard, the preferred formulation includes a water soluble surfactant, which also acts as a defoamer. In this regard, the inventor has discovered that a suitable substance may be secured commercially from PPG Industries under the trade designation Macol-LF-110. Macol-LF-110 is considered a nonionic surfactant. This same substance further acts as a metal cleaner for the metal offset printing plates. The fountain solution of the present invention further includes about 3% to about 10%, by weight, of a hydroxypropylene cellulose gum which is operable to make the water "wet", and which further attaches to the non-printing areas of the printing plate so that ink will only be attracted to the image areas of the plate, and will be repelled from the non-printing areas. An acceptable substance may be purchased commercially from the Aqualon Chemical Company under the trade designation "Aqualon—3085". The fountain solution of the present invention also includes about 0.6% to about 0.8%, by weight, of a polyethylene glycol wax. In this regard, this same wax facilitates the cleaning of the blanket cylinder, which is operable to transfer the printed image to the paper, or target substrate. A suitable wax may be purchased from Union Carbide Corporation under the trade designation "Carbowax-3350". The preferred formulation finally includes about 55% to about 95%, by weight, of water.

The fountain solution of the present invention may include additional compounds, or ingredients, as set forth hereinafter. These additional ingredients are not necessary to render the fountain solution operable, but rather, provide other desireable characteristics.

The fountain solution of the present invention may optionally include about 12% to about 20%, by weight, of a compatible cellulose gum. In this regard, the cellulose gum may be secured commercially from the Aqualon Chemical Company under the trade designation Ambergum-3021. In this regard, the Ambergum-3021 attaches to the non-printing areas of the plate thereby causing the ink to cover the image areas of the plate. The fountain solution of the present invention may also include about 0.7% to about 2%, by weight, of potassium nitrate. The potassium nitrate may be secured from a number of commercial sources. As should be understood, the potassium nitrate appears to act in a fashion whereby it facilitates the reoxidation of the surface of the printing plate. In particular, those skilled in the art will recognize that printing plates may be manufactured from substances such as aluminum, and therefore, they are quite soft, generally speaking. However, aluminum oxide, as a general matter, is quite hard, relatively speaking, in comparison to the aluminum. Therefore, to increase the longevity and serviceability of a printing plate, it is important to maintain the surface in an oxidized state. As will be appreciated, the normal printing process will typically cause the oxidized surface of a printing plate to become removed and therefore, the potassium nitrate is provided to enhance or otherwise facilitate the reoxidation of the printing plates surface. Additionally, it appears that the potassium nitrate also acts in a fashion where it cures the paper surface which comes into contact with same, as by removing fibers or other coatings which may be present on the surface of the paper, and which have a hard enough texture to damage the surface of the printing plate.

The fountain solution of the present invention may include, about 0.09% to about 0.2%, by weight, of sulfamic acid. In this regard, a suitable sulfamic acid may be secured commercially from the Van Waters and Rogers Chemical Company. The sulfamic acid provides a means by which the free ions found in the water such as iron (Fe) may be combined, or reacted with the acid, thereby preventing the substance from being deposited on the non-printing areas of the printing plate. In most instances, these iron deposits have a deleterious effect if they are deposited in areas, such as the non-printing areas of the printing plate where they have the propensity for attracting ink. As earlier discussed, this propensity to attract ink, in non-printing areas, is not desireable inasmuch as it leads to the production of printed matter which may, in some instances, be unacceptable. The fountain solution of the present invention may further include about 0.1% to about 2.0%, by weight, of sodium benzoate. The sodium benzoate may be commercially secured from a number of chemical manufacturers such as Kalama Chemical Corporation. The sodium benzoate, when combined in solution with citric acid, which will be discussed hereinafter, produces a by-product, benzoic acid. In the present formulation, the benzoic acid acts as a preservative thereby impeding the growth of microorganisms in the fountain solution.

As noted above, the fountain solution of the present invention may include about 2% to about 2.5%, by weight, of citric acid. The citric acid may be obtained from any number of commercial sources. As noted above, the citric acid is operable to react with the sodium benzoate thereby producing benzoic acid which subsequently acts as a preservative. Additionally, the citric acid is employed to lower, or otherwise adjust the pH to about 4. Additionally, the citric acid acts as a buffering agent for the solution.

The fountain solution of the present invention may also include about 0.03% to about 2%, by weight of magnesium sulfate. Similarly, the magnesium sulfate may be secured from any number of commercial sources. The magnesium sulfate is believed to react with free ions present in the water, such as iron, thereby substantially impeding the deposit of iron related compounds on the non-printing areas of the printing plate where their deposit would tend to attract ink. This, of course, is an undesirable result. The fountain solution of the present invention may also include about 0.9% to about 2%, by weight, of gum arabic. A suitable gum arabic may be secured under the same trade designation from Colloides Naturals Inc. It should be understood, that the gum arabic is operable to react with the citric acid and thereafter attach to the non-printing areas of the printing plate. As earlier discussed, the gum arabic will attract water, and will substantially repel ink thereby wetting the non-printing areas of the printing plate and thus defining the image area of the printing plate. The fountain solution of the present invention may also include, about 0.2% to about 0.3%, by weight, of sodium bisulfite. An acceptable sodium bisulfite may be commercially secured from the Van Waters and Rogers Chemical Company. The sodium bisulfite acts as a preservative, thereby impeding the growth of microorganisms in the fountain solution.

The fountain solution of the present invention may be formulated using any of the techniques known in the art. A representative example of this procedure includes introducing the selected weights of the individual constituent elements into a suitable enclosure or container, and then adding a sufficient volume of water, thereby forming a fountain solution having the weight ratios, noted above. Following agitation to form a homogeneous solution, the fountain solution is thereafter supplied to a suitable printing press for use.

As discussed earlier, additional, optional additives may be added to the fountain solution in order to modify particular physical properties.

The fountain solution of the present invention is further illustrated by the example which is set forth below. The fountain solution utilized in the present example was combined in the fashion as described above.

EXAMPLE 1

A composition made in accordance with the teachings of the present invention was formulated by the general procedure, noted above. This fountain solution had the following constituent elements.

- about 1.5%, by weight, of a poly alkoxylated polyether—(Macol-5100);
- about 0.15%, by weight, of a compatible surfactant—(Macol-LF-110);
- about 8.2%, by weight, of a hydroxypropylene cellulose gum—(Aqualon-3085);
- about 0.6%, by weight, of a polyethylene glycol wax—(Carbowax-3350);
- about 13.5%, by weight, of a compatible, cellulose gum—(Ambergum-3021);
- about 0.7%, by weight, of potassium nitrate;
- about 0.09%, by weight, of sulfamic acid;
- about 0.1%, by weight, of sodium benzoate;
- about 0.03%, by weight, of magnesium sulfate;
- about 0.9%, by weight, of gum arabic;
- about 2.4%, by weight, of citric acid;
- about 0.2%, by weight, of sodium bisulfite; and
- about 71.63%, by weight, of water.

EXAMPLE 2

A composition made in accordance with the teachings of the present invention was formulated by the general procedure, noted above. The fountain solution had the following constituent elements.

- about 1.5%, by weight, of a poly alkoxylated polyether—(Macol-5100);
- about 0.15%, by weight, of a compatible surfactant—(Macol-LF-110);
- about 3%, by weight, of a hydroxypropylene cellulose gum—(Aqualon-3085);
- about 0.7%, by weight, of a polyethylene glycol wax—(Carbowax-3350);
- about 15%, by weight, of a compatible, cellulose gum—(Ambergum-3021);
- about 0.8%, by weight, of potassium nitrate;
- about 0.1%, by weight, of sulfamic acid;
- about 0.1%, by weight, of sodium benzoate;
- about 0.03%, by weight, of magnesium sulfate;
- about 0.9%, by weight, of gum arabic;
- about 2.4%, by weight, of citric acid;
- about 0.2%, by weight, of sodium bisulfite; and
- about 75.12%, by weight, of water.

EXAMPLE 3

A composition made in accordance with the teachings of the present invention was formulated by the general procedure, noted above. The fountain solution had the following constituent elements.

- about 1.3%, by weight, of a poly alkoxylated polyether—(Macol-5100);
- about 0.15%, by weight, of a compatible surfactant—(Macol-LF-110);
- about 9.28%, by weight, of a hydroxypropylene cellulose gum—(Aqualon-3085);

about 0.55%, by weight, of a polyethylene glycol wax—(Carbowax-3350);
about 12.29%, by weight, of a compatible, cellulose gum—(Ambergum-3021);
about 0.64%, by weight, of potassium nitrate;
about 0.88%, by weight, of sulfamic acid;
about 0.09%, by weight, of sodium benzoate;
about 0.03%, by weight, of magnesium sulfate;
about 0.81%, by weight, of gum arabic;
about 2.18%, by weight, of citric acid;
about 0.2%, by weight, of sodium bisulfite; and
about 71.61%, by weight, of water.

In each of these particular examples, the respective fountain solutions were supplied to a conventional off-set printing press, and printed material was thereafter produced. Following analysis of the printed materials, as well as studying the condition of the synthetic surfaces which are mounted on the rollers, and the blanket cylinder, respectively, it was apparent that each of the fountain solutions possessed superior wetting characteristics, had the propensity for keeping the blanket cylinder substantially clean, and further facilitated the even dispersion, and coating of the ink. Additionally, each of the fountain solutions appeared to maintain the printing plates in an acceptable, oxidized state, and additionally displayed a good shelf life.

Therefore, it will be seen that the fountain solution of the present invention provides a fully dependable and practical means by which the non-printing areas of a printing plate may be wetted, thereby substantially impeding the attraction of ink to those areas. The fountain solution of the present invention further eliminates many of the deficiencies attendant with the prior art practices which include the utilization of substances which are classified as volatile organic contaminants, or which otherwise have the propensity for producing health hazards for humans; the fountain solution of the present invention being environmentally friendly, easy to manufacture, and which further improves a printed work product when employed with conventional printing presses of the prior art.

It will be apparent to those skilled in the art that the foregoing example has been made for purposes of illustration and that variations may be made in proportions, procedures, and material without departing from the scope of the present invention. Therefore, it is intended that this invention not be limited except by the claims which follow.

Having described my new invention, what I claim as new and desire to secure by letters patent of the United States is:

1. A fountain solution for use in printing consisting essentially of:
about 0.7% to about 1.5%, by weight, of a poly alkoxylated polyether;
about 0.1% to about 0.5% by weight of a non-ionic surfactant;
about 3% to about 10%, by weight of a hydroxypropylene cellulose gum;
about 0.6% to about 0.8% by weight, of a polyethylene glycol wax; and
about 85% to about 95%, by weight, of water.

2. A fountain solution as claimed in claim 1, and wherein the fountain solution further includes:
about 0.7% to about 2%, by weight, of potassium nitrate;
about 0.09% to about 0.2%, by weight, of sulfamic acid;
about 0.1% to about 2%, by weight, of sodium benzoate;
about 0.03% to about 2%, by weight, of magnesium sulfate;
about 0.9% to about 2%, by weight, of gum arabic;
about 2% to about 2.5%, by weight, of citric acid; and
about 0.2% to about 0.03%, by weight of sodium bisulfite.

3. A fountain solution for use in printing comprising:
about 0.7% to about 1.5%, by weight, of a poly alkoxylated polyether;
about 0.1% to about 0.15%, by weight, of a non-ionic, water soluble surfactant;
about 0.6% to about 0.08%, by weight, of a polyethylene glycol wax;
about 12% to about 20% by weight, of a cellulose gum;
about 3% to about 10%, by weight, of a hydroxypropylene cellulose gum;
about 0.9% to about 2%, by weight, of gum arabic;
about 0.7% to about 2%, by weight, of potassium nitrate;
about 0.03% to about 2%; by weight of magnesium sulfate;
about 0.09% to about 0.2%, by weight, of sulfamic acid;
about 0.1% to about 2%, by weight, of sodim benzoate;
about 0.2% to about 0.3%, by weight, of sodim bisulfite;
about 2.4% by weight, of citric acid; and
about 59% to about 83%, by weight of water.

* * * * *